(12) United States Patent  
Hsiao

(10) Patent No.: US 9,612,389 B2  
(45) Date of Patent: Apr. 4, 2017

(54) DISPLAY DEVICE HAVING LIGHT GUIDE COMPONENT

(71) Applicant: Young Lighting Technology Inc., Hsin-Chu (TW)

(72) Inventor: Chun-Chung Hsiao, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 64 days.

(21) Appl. No.: 14/741,461

(22) Filed: Jun. 17, 2015

(65) Prior Publication Data

US 2016/0062029 A1    Mar. 3, 2016

(30) Foreign Application Priority Data

Aug. 26, 2014   (TW) .............................. 103129350 A

(51) Int. Cl.
 *F21V 8/00* (2006.01)
 *G02F 1/1335* (2006.01)

(52) U.S. Cl.
 CPC .......... *G02B 6/0063* (2013.01); *G02B 6/0041* (2013.01); *G02B 6/0051* (2013.01); *G02B 6/0061* (2013.01); *G02B 6/0088* (2013.01); *G02F 1/133615* (2013.01)

(58) Field of Classification Search
 CPC ............................ G02B 6/0063; G02F 1/1335
 See application file for complete search history.

(56) References Cited

U.S. PATENT DOCUMENTS

2013/0222736 A1    8/2013   Qi et al.

FOREIGN PATENT DOCUMENTS

| TW | 200801715 | 1/2008 |
|---|---|---|
| TW | M331678 | 5/2008 |
| TW | 201250345 | 12/2012 |
| TW | I402578 | 7/2013 |
| TW | I406055 | 8/2013 |
| TW | 201403174 | 1/2014 |
| TW | I422926 | 1/2014 |
| WO | 2013140464 | 9/2013 |

OTHER PUBLICATIONS

"Office Action of Taiwan Counterpart Application," issued on Sep. 7, 2015, p. 1-p. 7, in which the listed references were cited.

*Primary Examiner* — Joseph L Williams  
(74) *Attorney, Agent, or Firm* — Jianq Chyun IP Office

(57) ABSTRACT

A display device includes a casing, a display panel, a backlight module and a light guide component. The display panel is disposed in the casing. The backlight module is disposed in the casing and includes a light guide plate and a light source. The light guide plate has a light emitting surface and at least one side surface. The light source is adapted to provide a light beam to the light guide plate. A part of the light beam is illuminated toward the display panel from the light emitting surface. The light guide component is disposed in the casing and has a light incident end and a light emitting end. Another part of the light beam is illuminated toward the light incident end from the side surface, and is illuminated out of the casing from the light emitting end after being transmitted in the light guide component.

13 Claims, 5 Drawing Sheets

DISPLAY DEVICE HAVING LIGHT GUIDE COMPONENT

CROSS-REFERENCE TO RELATED APPLICATION

This application claims the priority benefit of Taiwan application serial no. 103129350, filed on Aug. 26, 2014. The entirety of the above-mentioned patent application is hereby incorporated by reference herein and made a part of this specification.

BACKGROUND

Field of the Invention

The invention relates to a display device, and particularly relates to a display device having a backlight module.

Description of Related Art

With the increasingly developments of the semiconductor industry and related electronic industries, smart phones, notebooks and digital display devices are all developing toward a more convenient, versatile, and aesthetically appearance direction. When using these products, a display screen is an indispensable interface, wherein, liquid crystal displays (LCD) have become the main stream for display screens. Due to the reason that the LCD panel does not emit light inherently, a backlight module needs to be arranged under the LCD panel, to provide the light necessary for displaying image.

As for smart phones and other types of mobile devices, in order to satisfy consumer demand, some mobile devices have additionally equipped light emitting components other than the existing backlight module, to provide the light needed for call alerts, exterior decorations, scene exhibition or other types of additional lighting effects. However, adding the additional light emitting component in a mobile device increases the manufacturing cost and consumes power, and thus poses a disadvantage for the light, thin, and narrow border designs of a mobile device.

Taiwan patent number TWI402578 discloses a display, wherein a light emitted by a light source of a backlight module passes through a light guide plate, an imaging unit and a scene light guide unit to be emitted out, so as to provide a scene light. Taiwan patent number TWI422926 discloses a portable electronic device including a lid and main body which are able to be opened or closed relatively, where the lid has a light emitting port facing a keyboard of the main body, and a part of a light emitted by a light source of the backlight module inside the lid is projected towards the keyboard through the light emitting port by transmitting of a first light guide plate and a second light guide plate. United States patent publication US20130222736A1 discloses an electronic device, where a part of a light emitted by a light source of a backlight module is adapted to become an indicator backlight through an indicator structure on a case of the electronic device.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention was acknowlsurfaced by a person of ordinary skill in the art.

SUMMARY OF THE INVENTION

The invention provides a display device, utilizing a light source of a backlight module thereof to provide additional lighting effects on the exterior of the display device.

The other objectives and advantages of the invention can be further understood through the technical features disclosed in the invention.

To achieve an objective, part of the objectives or all of the objectives above, an embodiment of the invention provides a display device, including a casing, a display panel, a backlight module and a light guide component. The display panel is disposed in the casing. The backlight module is disposed in the casing and includes a light guide plate and a light source. The light guide plate has a light emitting surface, a bottom surface, a light incident surface connecting the light emitting surface and the bottom surface, and at least one side surface. The light emitting surface faces the display panel. The light source is disposed at a side of the light incident surface and is suitable for providing a light beam to the light guide plate. A part of the light beam is illuminated toward the display panel from the light emitting surface after being transmitted in the light guide plate. The light guide component is disposed in the casing and has a light incident end and a light emitting end. The light incident end is aligned to the side surface. The light emitting end is exposed by the casing. Another part of the light beam is illuminated toward the light incident end from the side surface after being transmitted in the light guide plate, and is illuminated out of the casing from the light emitting end after being transmitted in the light guide component.

In an embodiment of the invention, there is a gap between the light incident end of the light guide component and the side surface of the light guide plate.

In an embodiment of the invention, the light incident end of the light guide component is integrally connected to the side surface of the light guide plate.

In an embodiment of the invention, an amount of the at least one side surface is plural, and the light incident end of the light guide component is aligned to at least one of the side surfaces.

In an embodiment of the invention, the display device has a front surface, wherein the display panel displays an image through the front surface, and the light emitting end of the light guide component is exposed at the front surface.

In an embodiment of the invention, the display device, includes a front panel, wherein the front panel is disposed at the front surface, the casing has a side wall surrounding the front panel, and the light emitting end of the light guide component is located between a periphery of the front panel and the side wall.

In an embodiment of the invention, a material of the light guide component includes an elastic material.

In an embodiment of the invention, the display device has a front surface and a side surface, wherein the display panel displays an image through the front surface, and the light emitting end of the light guide component is exposed at the side surface.

In an embodiment of the invention, the casing has a slot, an end of the slot is formed at the side surface of the display device, the light guide component is at least partially located in the slot, and the light emitting end of the light guide component is located at the end of the slot.

In an embodiment of the invention, the light guide component has a plurality of diffusing particles therein.

In an embodiment of the invention, a density of the diffusing particles is increased along a direction away from the light source.

In an embodiment of the invention, the display device further includes a diffusing sheet, wherein the diffusing sheet is disposed at the light incident end of the light guide component.

In an embodiment of the invention, the display device further includes a color sheet, wherein the color sheet is disposed at the light incident end of the light guide component.

Based on the above, the embodiments of the invention have at least one of the features below. In the embodiments of the invention, the light guide component is disposed in the casing of the display device, the light incident end of the light guide component faces the backlight module, and the light emitting end of the light guide component is exposed by the casing. Accordingly, a part of the light beam emitted by the light source of the backlight module could be transmitted to the light guide component from the side surface of the light guide plate, and be illuminated out of the casing through the light guide component, so as to provide the light needed for call alerts, exterior decorations, scene exhibition or other type of additional lightning effects at the exterior of the display device. Since the display device of the invention provides additional lighting effects by utilizing the light source of the backlight module as above mentioned and not by utilizing additionally equipped light emitting components, manufacturing costs and battery consumption of the display device could be saved, and the light, thin, and narrow border designs of display devices are improved. Additionally, since the light beam for the additional lighting effects is transmitted from the side surface of the light guide plate to the light guide component and not transmitted from the light emitting surface of the light guide plate to the light guide component, the light beam illuminated from the light emitting surface of the light guide plate could be provided more completely to the display panel, allowing the display device to have a better and uniform display brightness.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
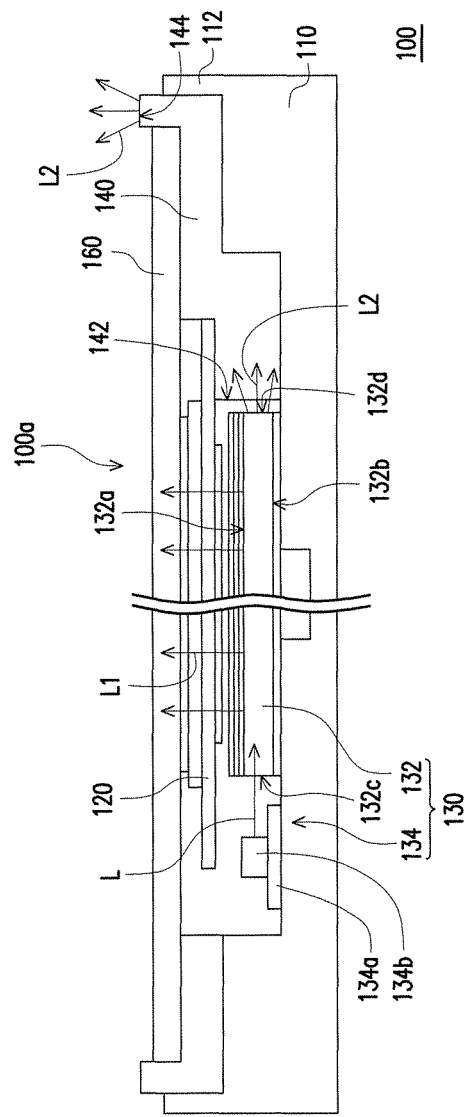
FIG. 1 is a cross-sectional view illustrating a display device according to an embodiment of the invention.

FIG. 1 is a cross-sectional view illustrating a display device according to an embodiment of the invention. Referring to FIG. 1, the display device 100 of the embodiment, for example, is a mobile display device, and in particular a smart phone or notebook but is not intended to be limited thereto. The display device 100 includes a casing 110, a display panel 120, a backlight module 130 and a light guide component 140. The display panel 120, for example, is an LCD panel and is disposed in the casing 110. The backlight module 130 is disposed in the casing 110 and includes a light guide plate 132 and a light source 134.

The light guide plate 132 has a light emitting surface 132a, a bottom surface 132b, a light incident surface 132c connecting the light emitting surface 132a and the bottom surface 132b, and at least one side surface 132d. The light emitting surface 132a of the light guide plate 132 faces the display panel 120. The light source 134, for example, is a light emitting diode (LED) light bar and includes a substrate 134a and LED elements 134b disposed on the substrate 134a. The light source 134 is disposed at a side of the light incident surface 132c of the light guide plate 132 and is suitable for providing a light beam L to the light guide plate 132. The light guide component 140 is disposed in the casing 110 and has a light incident end 142 and a light emitting end 144, the light incident end 142 is aligned to the side surface 132d of the light guide plate 132, and the light emitting end 144 is exposed by the casing 110.

A part of the light beam L (labeled as L1) emitted by the light source 134 is illuminated toward the display panel 120 from the light emitting surface 132a of the light guide plate 132 after being transmitted in the light guide plate 132, to provide the display panel 120 with the light needed when displaying an image. Another part of the light beam L (labeled as L2) is illuminated toward the light incident end 142 of the light guide component 140 from the side surface 132d of the light guide plate 132 after being transmitted in the light guide plate 132, and is illuminated out of the casing 110 from the light emitting end 144 of the light guide component 140 after being transmitted in the light guide component 140.

Based on the above arrangement, a part of the light beam L2 emitted by the light source 134 of the backlight module 130 could be transmitted to the light guide component 140 from the side surface 132d of the light guide plate 132, and is illuminated out of the casing 110 through the light guide component 140, so as to provide the light needed for call alerts, exterior decorations, scene exhibition or other type of additional lighting effects. Since the display device 100 provides additional lighting effects by utilizing the light source 134 of the backlight module 130 as above mentioned and not by utilizing additionally equipped light emitting components, manufacturing costs and battery consumption of the display device 100 could be saved, and the thickness and width of the border of the display device 100 would not be increased from additionally added light emitting components, such that the light, thin, and narrow border designs of the display device 100 are improved. Additionally, since the light beam L2 for the additional lighting effects is transmitted to the light guide component 140 from the side surface 132d of the light guide plate 132, and not transmitted to the light guide component 140 from the light emitting surface 132a of the light guide plate 132, the light beam L1 illuminated from the light emitting surface 132a of the light guide plate 132 could be provided more completely to the display panel 120, allowing the display device 100 to have a better and uniform display brightness.

Figure 2:
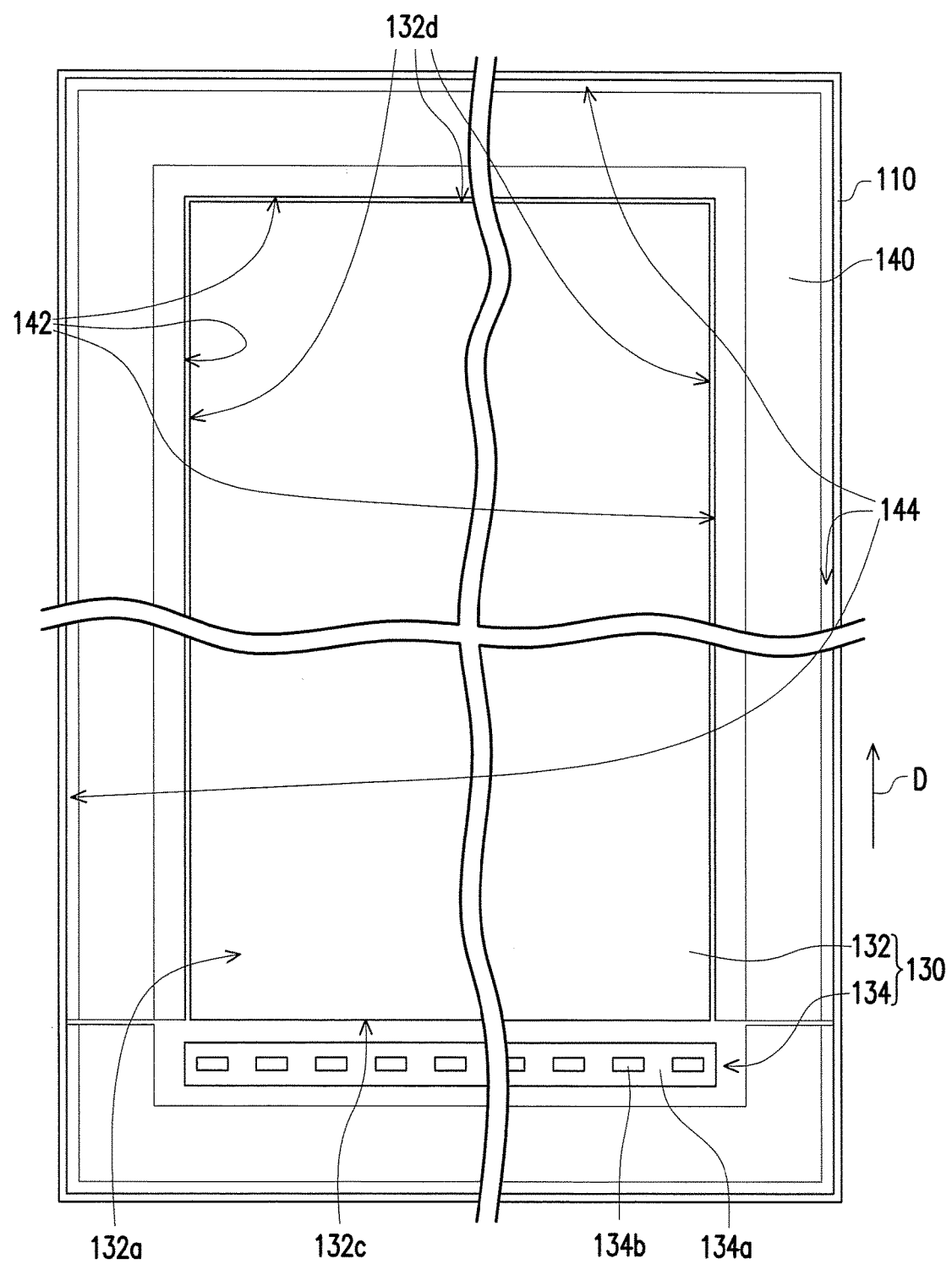
FIG. 2 is a top view illustrating partial components of the display device of FIG. 1.

FIG. 2 is a top view illustrating partial components of the display device of FIG. 1. To make the figure more clear, the display panel 120 and the front panel 160 in FIG. 1 is not depicted in FIG. 2. Referring to FIG. 2, in the embodiment, an amount of the side surfaces 132d of the light guide plate 132 is plural (three are depicted here), and the light incident end 142 of the light guide component 140 is aligned to the three side surfaces 132d of the light guide plate 132. In other embodiments, the light incident end 142 of the light guide component 140 could be aligned to only one or two of the side surfaces 132d of the light guide plate 132, and the invention is not limited thereto.

In addition, the light guide component 140 of the embodiment, for example, has a plurality of diffusing particles (not depicted) therein, such that the light beam L2 is illuminated out from the light emitting end 144 more uniformly after passing through the light guide component 140. More specifically, the distance between each section of the light guide component 140 and the light source 134 may be different and may cause the light intensity of the light beam L2 received at each section to differ. In view of this, the density of the diffusing particles could be arranged to be increased along a direction D away from the light source 134, such that the light intensity of the light beam L2 illuminated out from the light guide component 140 is more consistent. In other embodiments, the density distribution of the diffusing particles could be varied according to requirements, and the invention is not limited thereto.

Figure 3:
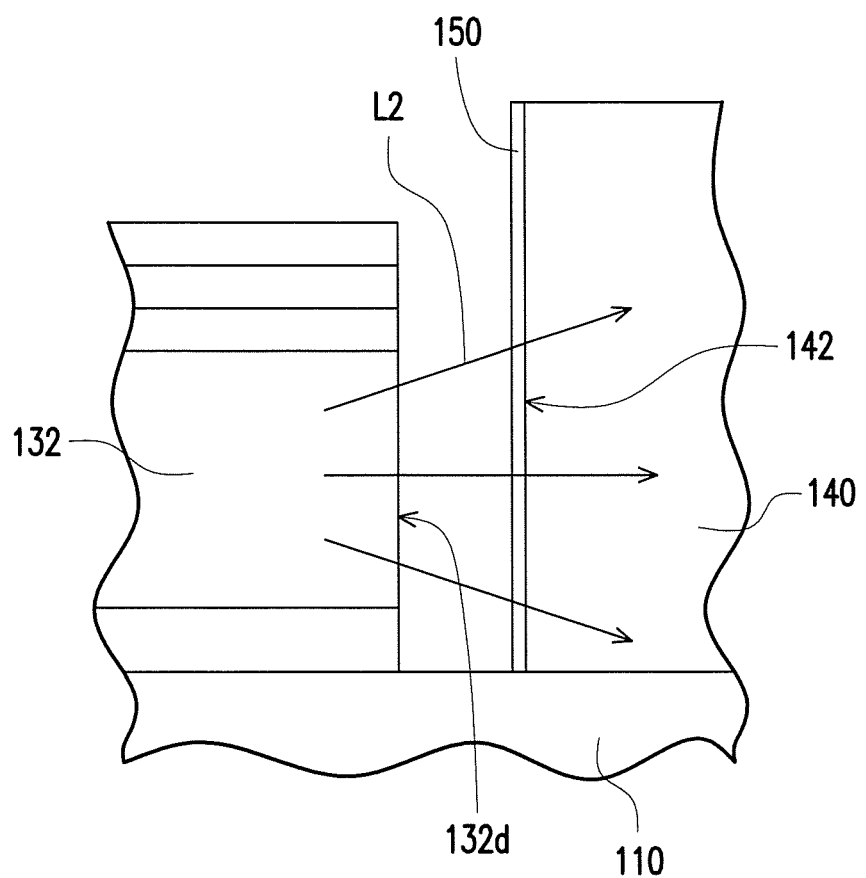
FIG. 3 is an enlarged schematic illustrating the display device of FIG. 1.

FIG. 3 is an enlarged schematic illustrating the display device of FIG. 1. Referring to FIG. 3, the display device 100 of the embodiment further includes a diffusing sheet 150, the diffusing sheet 150 is disposed at the light incident end 142 of the light guide component 140 and faces the side surface 132d of the light guide plate 132, to further increase the uniformity of the light beam L2 after being illuminated into the light guide component 140. In other embodiments, the display device 100 could also include a color sheet, the color sheet is disposed at the light incident end 142 of the light guide component 140 similar to the diffusing sheet 150 to change the color of the light beam L2, for providing additional lighting effects with different colors.

Referring to FIG. 1, the display device 100 in the embodiment has a front surface 100a, the display device panel 120 displays an image through the front surface 100a of the display device 100, and the light emitting end 144 of the light guide component 140 is exposed at the front surface 100a of the display device 100. In the embodiment, the material of the light guide component 140 could be plastic, rubber or other types of elastic material to provide a cushioning effect between components of the display device 100, and is detailed below. The display device 100 further includes a front panel 160, the front panel 160, for example, is a touch panel or a transparent protective plate and is disposed at the front surface 100a of the display device 100. The casing 110 has a side wall 112. The side wall 112 surrounds the front panel 160, and the light emitting end 144 of the light guide component 140 is located between the periphery of the front panel 160 and the side wall 112 as a cushioning material between the front panel 160 and the casing 110. Accordingly, the light guide component 140 combines both a light guide function and a cushioning function, and it is no need to separately dispose a cushioning component and a light guide component in the display device 100, so as to further save in manufacturing costs as well as decrease the thickness and width of the border of the display device 100.

Figure 4:
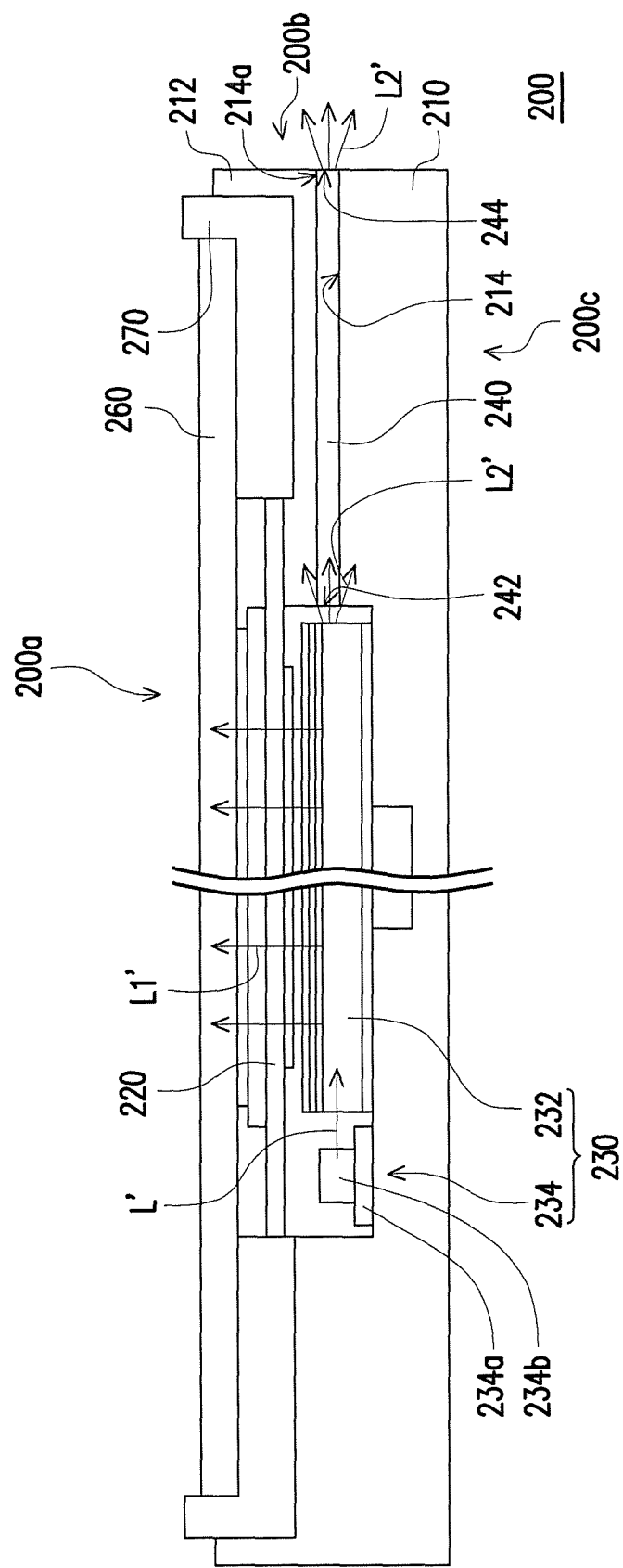
FIG. 4 is a cross-sectional view illustrating a display device according to another embodiment of the invention.

Aside from the light emitting end 144 of the light guide component 140 being exposed at the front surface 100a of the display device 100 as above, the light emitting end 144 could also be exposed at the side surface or the back surface of the display device 100, as will be described below with examples accompanied with drawings. FIG. 4 is a cross-sectional view illustrating a display device according to another embodiment of the invention. In the display device 200 of FIG. 4, the functions of the casing 210, the display panel 220, the backlight module 230, the light guide component 240 and the light incident end 242 thereof, the light guide plate 232, the light source 234, the substrate 234a, the LED component 234b, the front panel 260, the light beam L', the light beam L1' and the light beam L2' are similar to the functions of the casing 110, the display panel 120, the backlight module 130, the light guide component 140 and the light incident end 142 thereof, the light guide plate 132, the light source 134, the substrate 134a, the LED component 134b, the front panel 160, the light beam L, the light beam L1 and the light beam L2 of FIG. 1, and will not be repeated here. The difference between the display device 200 and the display device 100 lies in, the light emitting end 244 of the light guide component 240 is exposed at the side surface 200b of the display device 200 and not exposed at the front surface 200a of the display device 200.

More specifically, in the display device 200 of the embodiment, the casing 210 has a slot 214, and an end 214a of the slot 214 is formed at the side surface 200b of the display device 200. The light guide component 240 is at least partially located in the slot 214 and the light emitting end 244 of the light guide component 240 is located at the end 214a of the slot 214 to be exposed, such that additional lighting effects is provided at the side surface 200b of the display device 200 by the light beam L2'. In other embodiments, the slot 214 and the light guide component 240 could be extended to the back surface 200c of the display device 200, and provide additional lighting effects at the back surface 200c of the display device 200, and the invention is not limited thereto.

In addition, since the light emitting end 244 of the light guide component 240 of the embodiment does not extend to in-between the side wall 212 of the casing 210 and the front panel 260 to perform the cushioning effect, a cushioning component 270 could be disposed between the side wall 212 and the periphery of the front panel 260, and the material of the cushioning component 270, for example, is plastic, rubber or other type of elastic material.

Figure 5:
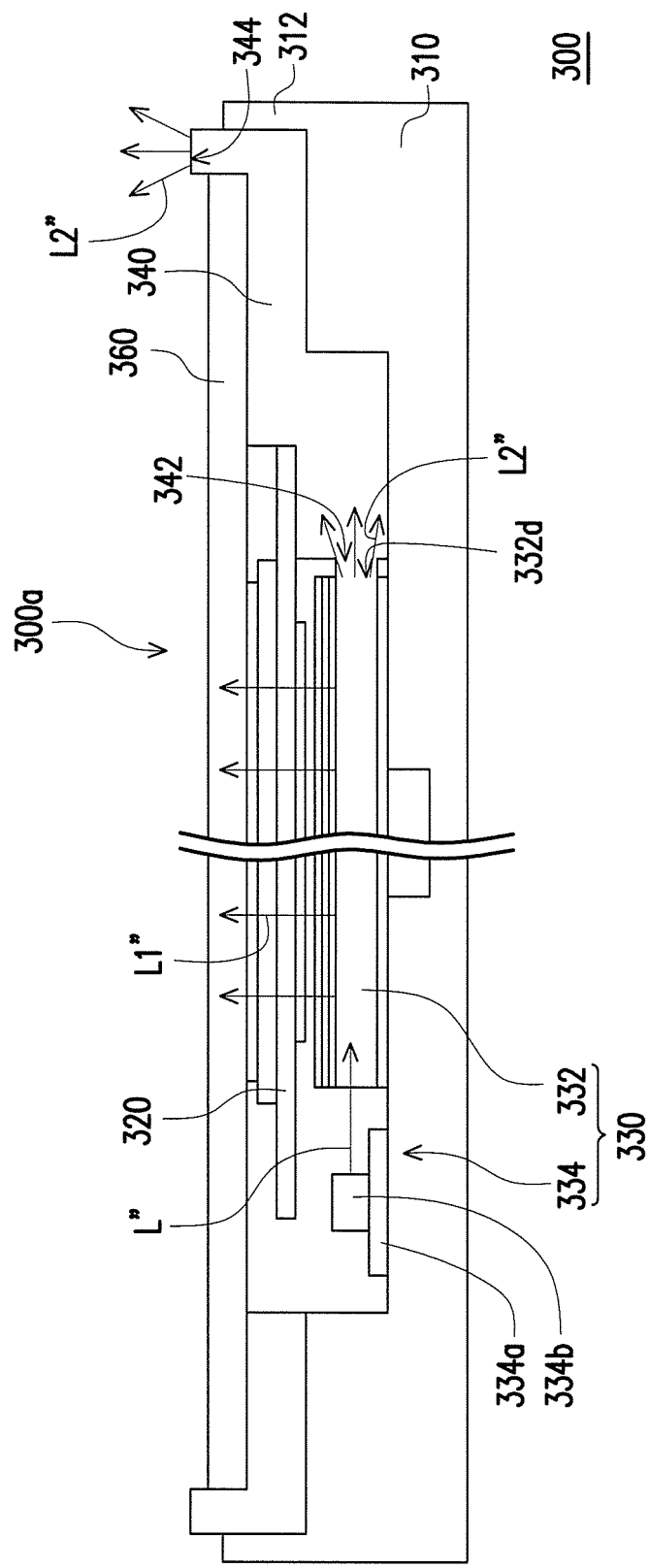
FIG. 5 is a cross-sectional view illustrating a display device according to another embodiment of the invention.

In the embodiment of FIG. 1, there is a gap between the light incident end 142 of the light guide component 140 and the side surface 132d of the light guide plate 132, namely, the light guide component 140 and the light guide plate 132 is not an integral structure, and the invention is not limited thereto. FIG. 5 is a cross-sectional view illustrating a display device according to another embodiment of the invention. In the display device 300 of FIG. 5, the functions of the casing 310, the display panel 320, the backlight module 330, the light guide component 340 and the light emitting end 344 thereof, the light guide plate 332, the light source 334, the substrate 334a, the LED component 334b, the front panel 360, the light beam L", the light beam L1" and the light beam L2" are similar to the functions of the casing 110, the display panel 120, the backlight module 130, the light guide component 140 and the light emitting end 144 thereof, the light guide plate 132, the light source 134, the substrate 134a, the LED component 134b, the front panel 160, the light beam L, the light beam L1 and the light beam L2 of FIG. 1, and will not be repeated here. The difference between the display device 300 and the display device 100 lies in, the light incident end 342 of the light guide component 340 is integrally connected to the side surface 332d of the light guide plate 332, namely, the light guide component 340 and the light guide plate 332 is an integral structure and could be manufactured in the same manufacturing process.

In summary, the embodiments of the invention, the light guide component is disposed in the casing of the display device, the light incident end of the light guide component faces the backlight module, and the light emitting end of the light guide component is exposed by the casing. Accordingly, a part of the light beam emitted by the light source of the backlight module could be transmitted to the light guide component from the side surface of the light guide plate, and be illuminated out of the casing through the light guide component, so as to provide the light needed for call alerts, exterior decorations, scene exhibition or other type of additional lightning effects at the casing. Since the display device of the invention provides additional lighting effects by utilizing the light source of the backlight module as above mentioned and not by utilizing additionally equipped light emitting components, manufacturing costs and battery consumption of the display device could be saved, and the light, thin, and narrow border designs of display devices are improved. Additionally, since the light beam for the additional lighting effects is transmitted from the side surface of the light guide plate to the light guide component and not transmitted from the light emitting surface of the light guide plate to the light guide component, the light beam illuminated from the light emitting surface of the light guide plate could be provided more completely to the display panel, allowing the display device to have a better and uniform display brightness. Further, the material of the light guide component could be an elastic material and the light guide component could extend to in-between the peripheral of the front panel of the display device and the side wall of the casing, to act as a cushioning material between the front panel and the casing. Accordingly, the light guide component combines the light guide function and cushioning function, and it is no need to separately dispose a cushioning component and a light guide component in the display device, so as to further save in manufacturing cost and decrease the thickness and width of the border of the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A display device, comprising:
a casing;
a display panel, disposed in the casing;
a backlight module, disposed in the casing and comprising a light guide plate and a light source, wherein the light guide plate has a light emitting surface, a bottom surface, a light incident surface connecting the light emitting surface and the bottom surface, and at least one side surface, the light emitting surface faces the display panel, the light source is disposed at a side of the light incident surface and is suitable for providing a light beam to the light guide plate, and a part of the light beam is illuminated toward the display panel from the light emitting surface after being transmitted in the light guide plate; and a light guide component, disposed in the casing and having a light incident end and a light emitting end, wherein the light incident end is aligned to the side surface, the light emitting end is exposed by the casing, and another part of the light beam is illuminated toward the light incident end from the side surface after being transmitted in the light guide plate, and is illuminated out of the casing from the light emitting end after being transmitted in the light guide component.

2. The display device as claimed in claim 1, wherein there is a gap between the light incident end of the light guide component and the side surface of the light guide plate.

3. The display device as claimed in claim 1, wherein the light incident end of the light guide component is integrally connected to the side surface of the light guide plate.

4. The display device as claimed in claim 1, wherein an amount of the at least one side surface is plural, and the light incident end of the light guide component is aligned to at least one of the side surfaces.

5. The display device as claimed in claim 1, having a front surface, wherein the display panel displays an image through the front surface, and the light emitting end of the light guide component is exposed at the front surface.

6. The display device as claimed in claim 5, comprising a front panel, wherein the front panel is disposed at the front surface, the casing has a side wall surrounding the front panel, and the light emitting end of the light guide component is located between a peripheral of the front panel and the side wall.

7. The display device as claimed in claim 1, wherein a material of the light guide component comprises an elastic material.

8. The display device as claimed in claim 1, having a front surface and a side surface, wherein the display panel displays an image through the front surface, and the light emitting end of the light guide component is exposed at the side surface.

9. The display device as claimed in claim 8, wherein the casing has a slot, an end of the slot is formed at the side surface, the light guide component is at least partially located in the slot, and the light emitting end is located at the end of the slot.

10. The display device as claimed in claim 1, wherein the light guide component has a plurality of diffusing particles therein.

11. The display device as claimed in claim 10, wherein a density of the diffusing particles is increased along a direction away from the light source.

12. The display device as claimed in claim 1, further comprising a diffusing sheet, wherein the diffusing sheet is disposed at the light incident end of the light guide component.

13. The display device as claimed in claim 1, further comprising a color sheet, wherein the color sheet is disposed at the light incident end of the light guide component.

* * * * *